Figure 1:
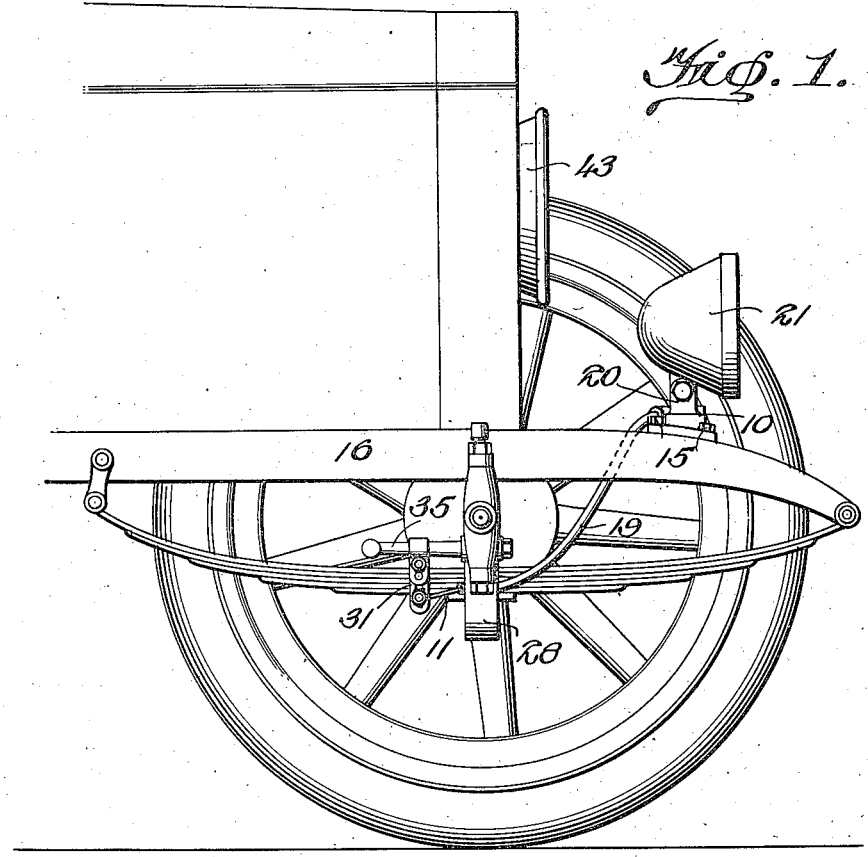

May 15, 1923.  
S. E. ORR  
DIRIGIBLE LIGHT FOR MOTOR VEHICLES  
Filed Nov. 7, 1921

1,454,981

2 Sheets—Sheet 1

Inventor  
Sumner E. Orr,  
by Bright & Bailey  
Attorneys

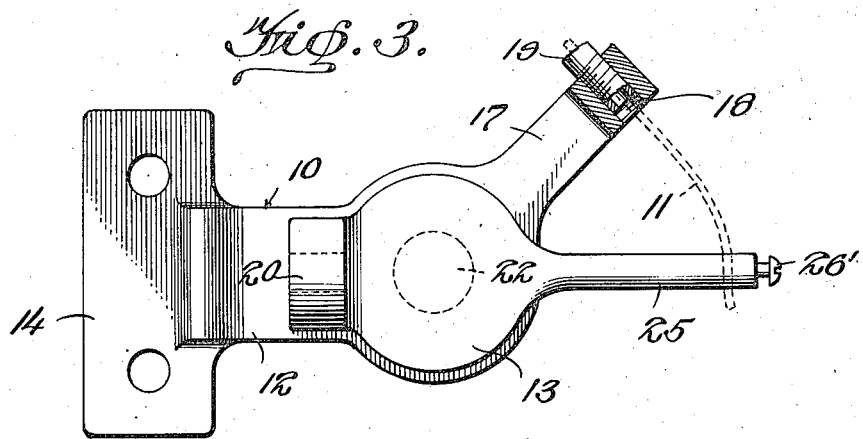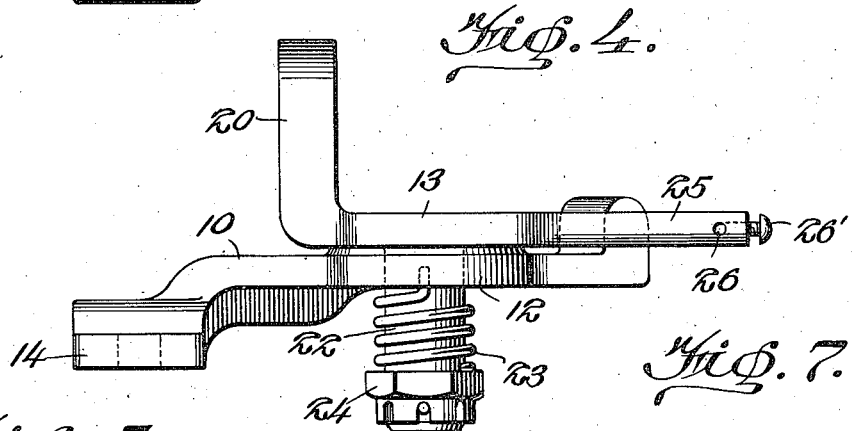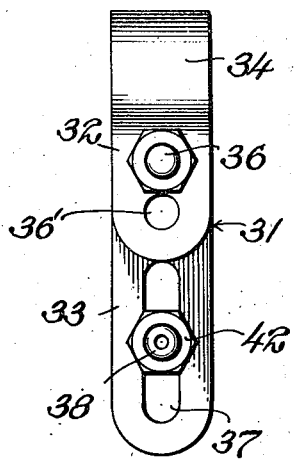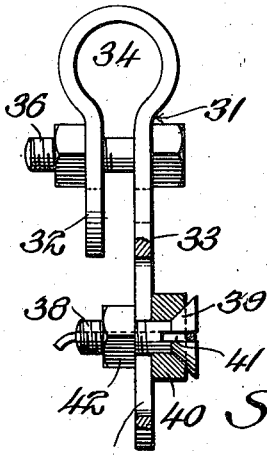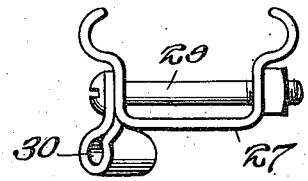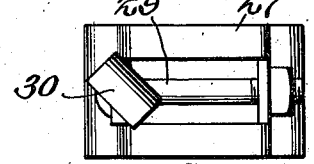

Patented May 15, 1923.

1,454,981

UNITED STATES PATENT OFFICE.

SUMNER E. ORR, OF TACOMA, WASHINGTON.

DIRIGIBLE LIGHT FOR MOTOR VEHICLES.

Application filed November 7, 1921. Serial No. 513,413.

*To all whom it may concern:*

Be it known that I, SUMNER E. ORR, a citizen of the United States, and resident of Tacoma, in the county of Pierce and State of Washington, have invented certain new and useful Improvements in Dirigible Lights for Motor Vehicles, of which the following is a specification.

My invention relates to improvements in dirigible lights for motor vehicles, and consists more particularly in the provision of a lamp which is operatively connected with the vehicle steering mechanism so that when the latter is turned the lamp will be also turned to thereby project its light at all times in the direction of travel of the vehicle.

An object of my invention resides in the provision of a dirigible lamp mounting and operating mechanism which may be quickly and easily attached to motor vehicles of various designs without material alteration thereto, and which is strong, durable and thoroughly reliable and efficient in operation.

In automobile touring, the great desirability of having lights that can be turned in conformity with the movements of the car has been recognized. The spotlight at the side of the car has served somewhat to lessen the danger arising on account of not having the roadway lighted on curves. However, the spot lights and some types of dirigible lamps which heretofore have been provided, necessitate the removal by the operator of one hand from the steering wheel to turn said light, either spotlight or dirigible.

In roads which are dangerous, either by reason of their narrowness or steep grade, the safety requirements oblige the operator to have both hands on the steering wheel and hence has arisen the need of a dirigible lamp which is operated automatically by the steering mechanism of the vehicle. In the device heretofore provided, however, a serious objection obtains in establishing a connection between the steering gear and the lamp on account of the jars.

The steering mechanism is under constant vibration and while the lamp mounting may be secured to the frame of the car so that the springs are interposed between the running gear and the frame, with the result that the lamp is not subject to the severe jars of the steering gear, nevertheless, the great vibrations of the steering gear are transmitted to the lamp unless special provision be made for overcoming the same.

A primary object of my invention is to provide a dirigible lamp, the turning movements of which will be automatically made to conform to the movements of the steering gear and also, it is a primary object of my invention to provide such a dirigible lamp so connected to the steering gear that the movements of the steering gear will be imparted to the lamp without transmitting the objectionable vibrations of said steering gear so that a steadiness of light is provided by my invention.

Again, another problem present in providing steadiness of light by an automatically operated dirigible lamp, arises from the fact that the jars of the machine will tend to cause the mountings to wear and introduce considerable play between all the parts so that steadiness of light soon becomes impossible unless special provision is made to overcome the effect of said jars and unless the mechanism employed be of the minimum number of parts and simple in construction.

A primary object of my invention is to provide such a dirigible lamp which will be simple in construction and the parts so mounted that all tendency to wear between moving parts will not operate to result in unsteadiness of light and will be so mounted that a chattering between the parts will be eliminated. Also, it is a primary object of my invention to provide a dirigible lamp operating mechanism which will be inconspicuous and neat in appearance.

My inventive idea may be embodied in various mechanical structures, one of which is illustrated in the accompanying drawings and includes novel detail features of construction and arrangements, but it is to be understood that the structure shown is merely intended as a disclosure of the essential features of my invention in a preferred form.

In the drawings, wherein like characters of reference denote corresponding parts in the different views—

Figure 2:
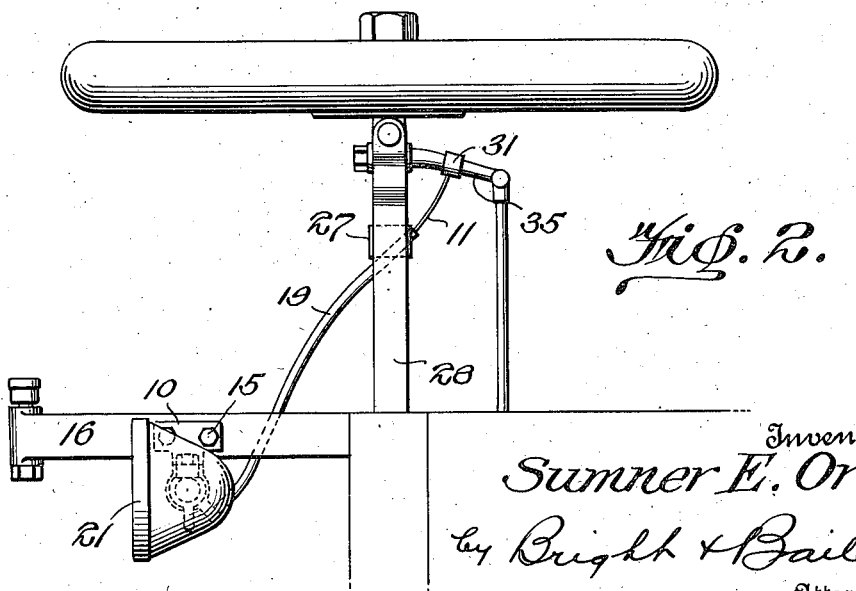

Figure 1 is a view in side elevation of the front portion of an automobile showing my improved dirigible lighting mechanism associated therewith, certain parts of the automobile being removed to more clearly disclose my invention;

Fig. 2, a top plan of what is disclosed in Fig. 1;

Fig. 3, a top plan partly in section of my improved light bracket;

Fig. 4, a side elevation of my light bracket;

Fig. 5, an elevation of a bracket for securing a lamp operating member to the automobile steering mechanism;

Fig. 6, an edge view of said bracket;

Fig. 7, an edge view of a supporting device for the lamp operating member; and

Fig. 8, a bottom plan of the device shown in Fig. 7.

Referring now to the drawings in detail, it will be observed that my improved dirigible light operating mechanism consists essentially of a lamp supporting bracket 10 and a flexible rod 11, which latter is secured at one end to the vehicle steering mechanism and at its other end to a portion of said lamp bracket whereby movements imparted to the steering mechanism will be simultaneously and correspondingly imparted to the lamp.

The bracket 10 consists of a base plate 12 and a lamp attaching plate 13 rotatably mounted thereon. The base plate is provided with an integral foot portion 14 suitably apertured to receive securing bolts 15 as indicated in Figures 1 and 2, whereby the same may be secured to the frame 16 of the vehicle, and is additionally provided with an angularly extending arm 17 having a threaded passage 18 into which is adapted to be threaded one end of a flexible tube 19 which houses the rod 11.

The plate 13 includes an upstanding apertured lug 20 whereby the lamp 21 may be secured thereto, while a stud 22, fixed with respect to said plate and extending through an opening in the base plate 12, provides for the rotation of said plate 13 with respect to the base plate, the two plates 12 and 13 being normally maintained in a definite predetermined relative rotative relation by a spring 23 which is coiled around the stud 22 and has one end fixed to the plate 12 and its other end fixed to the stud 22 or to a nut 24 which is threaded on and pinned to the stud, and which serves to retain spring 23 thereon.

Extending from the lamp attaching plate 13 is an arm 25 provided adjacent to its outer end with a transverse opening 26 adapted to receive one end of the rod 11 which latter may be adjusted through said opening and secured in desired relation with the arm 25 by a screw 26' threaded in said arm in intersecting relation to the opening 26.

A clamp device 27 illustrated in detail in Figs. 7 and 8 is adapted to be secured to the axle 28 of the vehicle to provide a fixed support for the second end of the tube 19. This clamp device is formed from relatively stiff sheet metal into substantially U-shape, the arms thereof being suitably shaped for gripping the axle 28 into which they may be drawn in clamping relation by a bolt 29. A portion of said device is rolled upon itself as at 30 to provide a tube like extension which is adapted to receive the lower end of tube 19 and one end of said rolled portion has the bolt 29 extending therethrough so that when the lower end of the tube 19 is inserted in said rolled portion, tightening of the bolt serves the dual function of clamping the device as an entirety to the axle and of clamping the tube 19 in said rolled portion.

In Figures 5 and 6 is illustrated a device 31 for adjustably securing the second or lower end of the rod 11 to the vehicle steering mechanism. This device consists of a flat piece of sheet metal bent upon itself to provide a pair of arms 32, 33 forming at one end of the device a loop 34 adapted to be arranged in embracing relation to and clamped in any desired longitudinally adjusted position along the steering knuckle arm 35 of said steering mechanism. A bolt 36 passing through the arms 32, 33 provides a simple and convenient means of drawing them together to thereby obtain the desired clamping effect of the loop upon the arm 35, and if desired, in order to accommodate the device for association with steering knuckle arms of different sizes, the arms 32, 33 may be provided with plural bolt receiving openings 36'.

The longer arm 33 of the device 31 is slotted as at 37 to receive a bolt 38, which latter is provided with a flared head 39 seating in a flared recess in a relatively thick washer 40. The head 39 is transversely slotted as at 41 and the shank of the bolt is preferably drilled to provide an opening extending throughout its length and in communication with said slot. The washer 40 is disposed against one face of the arm 33 and between said arm and the head 39 of the bolt, while a nut 42 threaded on the bolt and bearing against the opposite face of arm 33 provides a means whereby the head 39 may be drawn into the flared recess of the washer and as a result of the wedging action between the washer and flared head, close or partially close the slot 41. When the nut 42 is loosened the bolt may be slidably adjusted along the slot 37 and as is apparent tightening of the nut not only acts to close the slot 41, but acts also to secure the bolt in its adjusted position.

In applying the mechanism as described in the foregoing to a vehicle, the bracket 10 is secured to the frame of the vehicle, and the clamp devices 27, 31 are respectively secured to the axle 28 and steering knuckle arm 35; the tube 19 is secured at one end to the bracket 10 and at its other end to the device 27, and the flexible rod is inserted in said tube and secured at one end to the arm 25 of rotatable plate 13 and at its other end to the device 31. With this relation of parts established all movements imparted to the steering mechanism will also be imparted to the flexible rod 11 and through said rod to the rotatable plate 13 and the lamp carried thereby. In other words as the rearward end of the steering knuckle arm 35 is swung outwardly, a pulling force is exerted through the rod 11 to rotate the lamp inwardly against the force of the spring 23 on stud 22, and when the rearward end of the steering knuckle arm 35 is swung inwardly, the spring 23, which at all times keeps a tension in the flexible connector or rod 11, causes the lamp to rotate in the opposite direction, that is, to return to normal straight-ahead position, or outwardly, if the knuckle arm rotates inwardly sufficiently. In short, the spring 23 and the rod or connector 11 cause the movements of the lamp to conform to those of the steering knuckle arm 35. This arrangement is adapted to utilize the mechanical advantage arising by virtue of the lever arms afforded by the mountings and to make the movements of said lamp readily and positively conform to the course of the automobile. The tube 19 functions to prevent bulging or distortion of the flexible rod 11, and the spring 23, maintaining said tension upon the said connector or rod 11, functions to maintain the lamp steady in such position as it may be directed. The said spring also functions to clamp the lamp supporting plate securely to the bracket so that unsteadiness of light is avoided.

In securing the lower end of rod 11 to the device 31 the nut 42 is first loosened and the end of said rod inserted through the opening in the bolt with a portion of the same disposed in the slot 41, after which the nut is tightened to close the slot and clamp the rod therein.

In practice only a single lamp 21 with its associated operating mechanism need be employed, but if desired a pair of them may be used and operatively connected respectively to opposite sides of the vehicle steering mechanism. Furthermore, it is desirable that the lamp or lamps 21 be supplemental to the usual vehicle headlights 43, but if desired the latter may be removed from their usual mounts and secured to the plate or plates 13 and thus rendered dirigible as is apparent.

From the foregoing description taken in connection with the accompanying drawings it is believed that the construction, operation and advantages of my improvements will be clearly understood, and while I have herein shown and described one specific embodiment of my invention I do not limit myself to the details herein shown except for such limitations as may be defined in the appended claims.

I claim:—

1. The combination with a vehicle having a frame and steering gear, of a dirigible lamp operating mechanism embodying a bracket mounted on the vehicle frame, a rotatably mounted lamp supporting plate, operatively disposed on said bracket; a single flexible rod joining said lamp supporting plate to the steering gear; a spring operatively disposed between said bracket and said plate whereby said spring at all times tends to rotate said plate against the force of said rod, whereby is provided a flexible yielding connector between the steering mechanism and the lamp for providing steadiness of the light, said rod functioning to impart steering movements to the lamp.

2. The combination with a vehicle having a frame and steering gear of a dirigible lamp operating mechanism embodying a bracket mounted on the vehicle frame; a rotatably mounted lamp supporting plate operatively disposed on said bracket, said plate having a stud which extends through said bracket; a single flexible rod joining said lamp supporting plate to the steering gear; a spring adjusting nut on the end of said stud; a spring disposed on said stud, one end of said spring being fixed in said bracket and the other end fixed in said adjusting nut, said spring at all times tending to rotate the said plate against the efforts of said rod whereby is provided a flexible yielding connector between the steering gear and the lamp, said rod functioning to impart steering movements to the lamp, and said spring also functioning to clamp the lamp supporting plate to the bracket.

3. The combination with a vehicle having a frame and steering gear of a dirigible lamp operating mechanism embodying a bracket mounted on the vehicle frame; a rotatably mounted lamp supporting plate operatively disposed on said bracket, said plate having a stud which extends through said bracket; a single flexible rod joining said lamp supporting plate to the steering gear; a housing tube for said rod, said tube being fixedly mounted independent of said rod; a spring adjusting nut on the end of said stud; a spring disposed on said stud, one end of said spring being fixed in said bracket and the other end fixed in said adjusting nut, said spring at all times tending to rotate the said plate against the efforts of said rod whereby is provided a flexible yielding connector between the steering gear and the lamp, said rod functioning to impart steering movements to the lamp, and said spring also functioning to clamp the lamp supporting plate to the bracket.

4. A dirigible lamp operating mechanism embodying a bracket having a hole disposed therein; an arm integrally formed on said bracket; a rotatably mounted lamp supporting plate operatively disposed on said bracket; an arm carried by said plate; a lug vertically disposed on said plate; a stud carried by said plate operatively disposed in the said hole of said bracket; an adjusting nut on the end of said stud; a steering knuckle arm; a single flexible rod releasably secured at one end to said arm of said plate and secured at the other end to said steering knuckle arm whereby suitable leverage is provided for actuating said lamp supporting plate; a housing tube for said flexible connector, one end portion of said tube being mounted on the arm of said bracket and being mounted as respects the other end portion of said tube to the axle; a spring disposed of said stud, one end of said spring being fixed in said bracket and the other end being fixed in said adjusting nut, said spring at all times tending to rotate the said plate against the force of said rod, whereby is provided a flexible yielding connector between the steering mechanism and the said plate, said connector functioning to impart steering movements to the lamp, and said spring also functioning to clamp the lamp supporting plate to the bracket.

5. In combination with a dirigible lamp operating mechanism, a bracket; a lamp supporting plate having a stud operatively disposed in said bracket; a flexible rod connector secured to said plate; a spring adjusting nut disposed on the end of said stud, and a spring mounted on said stud having one end fixedly secured in said bracket and the other end secured in said nut, said spring exerting a tension at all times upon said rod.

6. In a dirigible lamp operating mechanism, a device for securing an end of a lamp operating rod to the steering mechanism of a vehicle including a bolt provided with a slot adapted to receive said rod, and means for closing said slot to thereby clamp the rod therein.

7. In a dirigible lamp operating mechanism, a device for securing an end of a lamp operating rod to the steering mechanism of a vehicle including an arm adapted to be secured to the steering knuckle arm of said steering mechanism, a bolt longitudinally adjustable along said arm, said bolt being provided with a slot adapted to receive said rod, and means for closing said slot to thereby clamp the rod therein.

8. In a dirigible lamp operating mechanism, a device for securing an end of a lamp operating rod to the steering mechanism of a vehicle including an arm adapted to be secured to the steering knuckle arm of said steering mechanism, a bolt longitudinally adjustable along said arm, said bolt being provided with a slot adapted to receive said rod, and a single means operable to close said slot to thereby clamp the rod therein and simultaneously secure the bolt in its longitudinally adjusted position with respect to said arm.

9. In a dirigible lamp operating mechanism, a device for securing an end of a lamp operating rod to the steering mechanism of a vehicle including a bolt provided with a slot adapted to receive said rod, and wedging means for closing said slot to thereby clamp the rod therein.

10. In a dirigible lamp operating mechanism, a device for securing an end of a lamp operating rod to the steering mechanism of a vehicle including an arm adapted to be secured to the steering knuckle arm of said steering mechanism, said arm being slotted, a headed bolt disposed in and longitudinally adjustable along said slot, the head of said bolt being flared and provided with a slot adapted to receive said rod, a washer disposed between the head of said bolt and said arm and provided with a flared recess receiving the flared head of the bolt, and a nut threaded on said bolt for drawing the head thereof into the flared recess of the washer to thereby close the slot and clamp the rod therein.

11. In a dirigible lamp operating mechanism, a clamp for securing a housing tube for a lamp operating rod to a portion of a vehicle including a substantially U-shaped member having a portion thereof rolled upon itself to receive the housing tube, and a bolt passing through the arms of said U-shaped member and through an end of said rolled portion and operable to impart a dual clamping action of the member upon a portion of the vehicle and of the rolled portion thereof upon said tube.

12. In a dirigible lamp operating mechanism, a bracket adapted to be secured to the frame of a vehicle, said bracket including a base plate and a lamp supporting plate rotatably mounted thereon, and a coil spring acting to hold said plates together, said spring having one end secured to the base plate and its other end secured to the lamp supporting plate whereby it acts solely to maintain said plates in a predetermined relatively rotated position, said lamp supporting plate being adapted for connection by a rod with the vehicle steering mechanism whereby steering movements imparted to the latter are simultaneously imparted to the lamp.

13. In combination with a dirigible lamp operating mechanism, a bracket; a lamp supporting plate rotatably disposed with respect to said bracket; a flexible rod connector secured to said plate; and means operatively disposed with respect to said plate and said flexible connector whereby said connector is maintained at all times under tension, with the result that said plate is caused to tend to return to a predetermined position at all times.

In testimony whereof I hereunto affix my signature.

SUMNER E. ORR.